United States Patent [19]

Peterson et al.

[11] Patent Number: 5,385,672
[45] Date of Patent: Jan. 31, 1995

[54] METHOD FOR PREPARING MEMBRANES WITH ADJUSTABLE SEPARATION PERFORMANCE

[75] Inventors: Eric S. Peterson, Idaho Falls; Christopher J. Orme, Shelley; Mark L. Stone, Idaho Falls, all of Id.

[73] Assignee: EG&G Idaho, Inc., Idaho Falls, Id.

[21] Appl. No.: 135,223

[22] Filed: Oct. 13, 1993

[51] Int. Cl.$^6$ .................. B01D 53/22; B01D 61/08
[52] U.S. Cl. .................................. 210/637; 210/640
[58] Field of Search ............... 210/637, 640, 650, 651, 210/652, 644

[56] References Cited

U.S. PATENT DOCUMENTS

| | | |
|---|---|---|
| 4,575,385 | 3/1986 | Brooks et al. .................. 55/158 |
| 4,909,810 | 3/1990 | Nakao et al. . |
| 5,049,282 | 9/1991 | Linder et al. . |
| 5,131,266 | 7/1992 | Hassett . |

OTHER PUBLICATIONS

*Concise Encyclopedia of Chemical Technology*, Ed. Kirke–Othmer, Wiley Interscience pp. 741–743.
*Handbook of Industrial Membrane Technology*, Mark C. Porter, Noyes Publications, Ch. 1; pp. 1–29, 46–56.
*The Membrane Alternative: Energy Implications for Industry*, Ed. John A. Howell, Elsevier Applied Science, NY, N.Y. pp. 1–7, 99–104.

*Primary Examiner*—Frank Spear
*Attorney, Agent, or Firm*—Mallinckrodt & Mallinckrodt

[57] ABSTRACT

Methods for adjustable separation of solutes and solvents involve the combination of the use of a maximally swollen membrane and subsequent vacuum depressurization exerted on the permeate side of that membrane. By adjusting the extent of depressurization it is possible to separate solvent from solutes and solutes from each other. Improved control of separation parameters as well as improved flux rates characterize the present invention.

14 Claims, 1 Drawing Sheet

METHOD FOR PREPARING MEMBRANES WITH ADJUSTABLE SEPARATION PERFORMANCE

CONTRACTUAL ORIGIN OF THE INVENTION

EG&G Idaho, Inc. has rights in this invention pursuant to Contract No. DE-AC07-76ID01570 between the United States Department of Energy and EG&G Idaho, Inc.

BACKGROUND OF THE INVENTION

1. Field

The present invention relates to methods of membrane preparation to effect selective separation of solution components.

2. State of the Art:

In recent years, the technology surrounding membranes and their use, for example in the separation of solutes from solution, has grown from simple laboratory procedures to industrial processes having considerable technical and commercial impact, Lonsdale, H. K., *J. Memb. Sci.*, 10 (1982), 81"181. Membranes are used on a large scale for many applications, among which are to produce potable water from sea water by reverse osmosis, to clean industrial effluents, to recover valuable constituents of solutions by electrolysis, and to effect various medical purposes.

Membrane chemistry and technology is interdisciplinary. On-going research strives to improve past processes which concern the selectivity and functionality of membranes. For example, Nakao et al. U.S. Pat. No. 4,909,810 discloses a vapor permselective membrane in the form of an ion exchange film made of a fluorine-containing polymer. Linder et al. U.S. Pat. No. 5,039,421 discloses a composite membrane for separating at least one dissolved component from another.

Transport of a solution through a membrane, normally for the purpose of separating at least one solute from a carrier liquid, is often accomplished by establishing a pressure differential at opposite faces of the membrane, whereby hydraulically driven permeation of the liquid solution is effected.

It can be shown thermodynamically that pressure differentials between the feed side or upstream face and the permeate side or downstream face of the membrane cause flux of the liquid components through the membrane. Such pressure differentials are related to membrane permeability by a well-known mathematical formula defining hydrostatic permeability (P): namely, $P = Jl\Delta\Phi$, where $J$ = permeant flux in appropriate units, $l$ = membrane thickness, and $\Delta\Phi$ is the difference in hydrostatic pressure between the feed side and permeate side of a membrane. Pressure is the most common driving force and accounts for several types of separation among which are pervaporation (PV), ultrafiltration (UF), reverse osmosis (RO) and microfiltration (MF). Although RO and PV are partially pressure and partially concentration driven, UF and MF are totally pressure driven.

Pressure differentials have frequently been produced by flowing a pressurized stream of a solution to be processed into the feed side of the membrane and less often by the additional use of a vacuum on the permeate side of the membrane. Hassett U.S. Pat. No. 5,131,266 suggests that a means for pervaporating an organic solvent may comprise a vacuum applied to the permeate side of a hollow tube membrane.

To date, flux rates have remained of moderate rate and selectivity of membrane permeability still remains problematic. The present invention provides improvement in the control of permeate rate of the flux, and in the selectivity of membrane permeability of solvents and solutes.

SUMMARY OF THE INVENTION

In accordance with the invention, a method is described of placing onto a porous support a membrane capable of being swollen by the application of a solution thereto. The solution is applied to the membrane until the membrane is substantially maximally swollen. Subsequently, vacuum depressurization is applied to the permeate side of the membrane. The combination of the swollen membrane and the subsequent application of vacuum depressurization at the permeate side of the membrane has been found, unexpectedly, to result in superior performance in flux rate and to provide adjustable selectivity of membrane permeability.

The method involves the steps of:

(1) placing onto a porous support a membrane which is capable of swelling in the presence of a solution comprising at least one solvent and at least one solute;

(2) applying the solution to the membrane in a manner to allow the membrane to swell substantially maximally;

(3) subsequently applying vacuum depressurization to the permeate side of the membrane while the solution is passed into the feed side of the membrane to thereby provide a flux rate through the membrane; and (4) continuing to adjust and selectively apply vacuum depressurization until the desired separation of solvent and solute or solutes and the desired flux rate are attained.

BRIEF DESCRIPTION OF THE DRAWINGS

The best mode presently contemplated for carrying out the invention in terms of laboratory apparatus is shown in the accompanying single sheet of drawings, in which.

DETAILED DESCRIPTION OF THE ILLUSTRATED EMBODIMENTS

Figure 1:
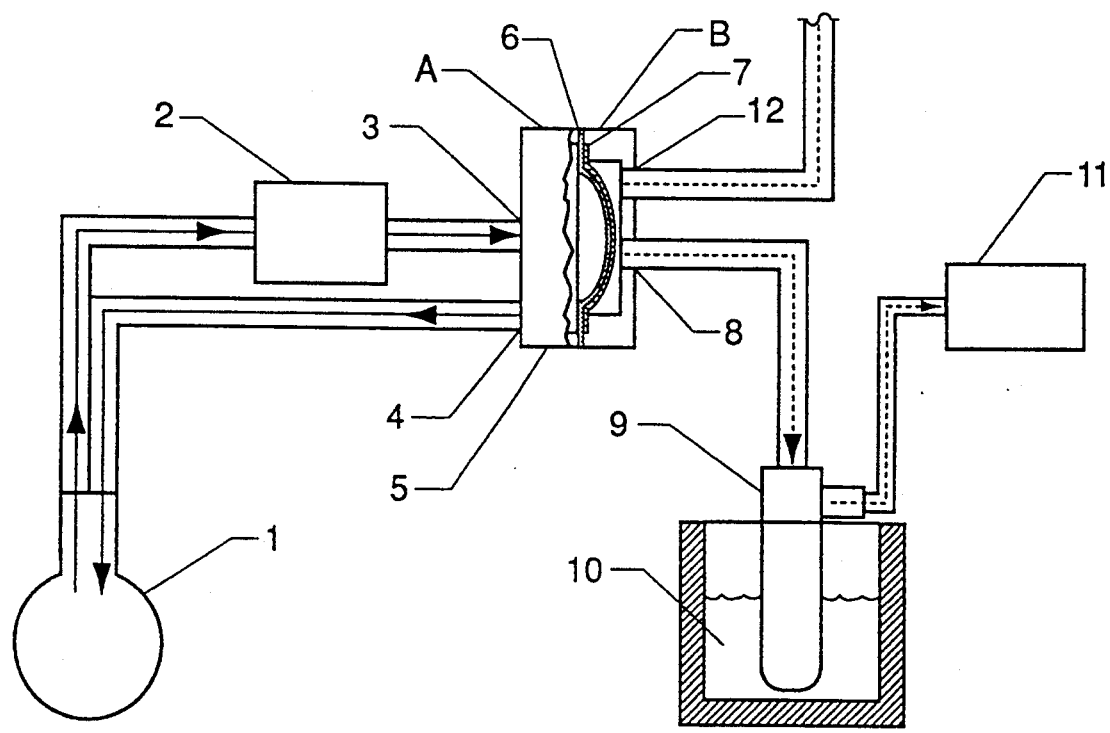
FIG. 1 is a schematic showing of laboratory apparatus for carrying out the method, including an elevation partly in vertical section of a typical cell containing the membrane and subjected to an applied vacuum in accordance with the invention.

In FIG. 1, the solution is fed from a flask 1 by means of a pump 2 via piping into an inlet 3 on the feed side of a cell 5. Part of the solution passes through a membrane 6, secured in a manner as to be in contact with a porous support 7 located approximately between the two halves, A and B, of the cell 5. Solution which does not permeate the membrane 6 is recycled back to flask 1 through outlet 4 of cell 5. The part of the solution that permeates the membrane 6 and porous support 7, which is liquid and possibly or partially a gas, passes through outlet 8 of cell 5 through piping to a cooling trap 9 which is cooled by a liquid nitrogen bath 10. A vacuum pump 11 exerts negative pressure through the porous support 7 to the permeate side of the membrane 6.

In another embodiment, a sweep gas such as helium can be passed into the cell 5 through inlet 12, in order to facilitate the movement of the permeate through the cell 5 to the outlet 8.

Figure 2:
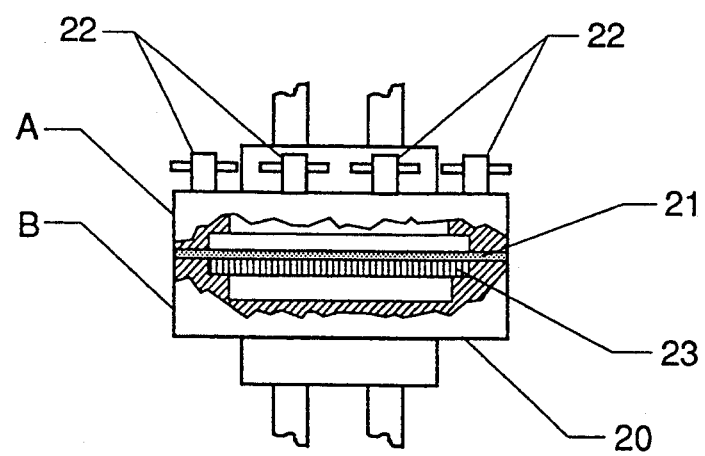
FIG. 2 is a similar but more detailed view of the cell included in the apparatus of FIG. 1, but with the apparatus not in operation.

In FIG. 2, in the preferred embodiment, cell 20, circular in shape, is shown in increased detail as an expanded view of cell 5 of FIG. 1. The membrane 21 is placed between the two halves, A and B, of cell 20. The two halves are shown as fastened together by bolts 22. This places the membrane adjacent to the porous support 23 which is part of the cell 20.

Methods for placing the membrane onto the porous support can be by direct polymerization of the membrane onto the porous support; by securing the membrane directly to the porous support; by securing the membrane a distance from the porous support to allow for support of the membrane or by any combination of these or other methods which would accomplish the same purpose.

The membrane is preferably prepared by conventional solution casting techniques from any one or more of the following polymers or copolymers: polyphosphazenes; polyacetals; polyacrylics; polyacrylonitriles; polyallylics; polycellulosics; polyepoxies; polyethylene vinyl alcohols; polyfluoro plastics; polyfurans; polyionomers; polyketones; polyphenolics, especially polymelamine phenolics; polyamides, such as nylon and polyphthalamide; polycarbonates; polydicyclopentadienes; polyesters, in the form of thermosets or thermoplastics; polyimides, such as polyetherimides; polyethylene and ethylene copolymers; polymethyl pentene; polyphenyleneoxide; polyphenylenesulfide; polypropylene; polystyrene and styrene copolymers such as acrilonitrile butadienestyrene and other vinyl polymers and copolymers; polyurethanes, in the form of thermosets or thermoplastics; polysilicones, such as polysiloxanes and silicone rubbers; polysulfones; thermoplastic elastomers; and polyureas.

The usual solution casting techniques include pouring a solution onto a non-porous surface and allowing the solvent to evaporate and then removing the membrane from the surface; slip-casting as when a solution is poured directly onto a fine porous surface; knife casting; dipping; and spray coating; among others. Alternatively, the membrane may be prepared by melt processing extrusion; or by in situ polymerization, for example, via cross-linking.

Cells containing the membranes and porous supports through which solutions to be treated are passed can be of various shades such as spherical, cylindrical, tubular, spiral, and other geometries. They can be constructed of metal, glass, plastic, ceramic, or polymer among other materials.

Various porous supports suitable for the passage of vacuum to the permeate side of the membrane include perforated structures such as rigid or semirigid sheets, flat discs, tubes, fibers, spirals and cylinders of various materials, such as metal, ceramic, glass, plastic or polymer. Other suitable supports are prepared from small particles of ceramic, metal, glass, or other suitable materials compacted together and scintered to form porous solid bodies. Tubular channels, such as oxide-grown ceramics, can be used. Polymers that are thin, dense, and porous films, or that are provided with small holes, can serve as supports in various forms such as flat discs, sheets, tubes, and hollow fibers.

Suitable solvents included in a solution to be treated pursuant to the invention are alcohols, such as methanol, ethanol isopropanol, glycerol, propanol, butanol, amyl alcohol, thymol nitrophenol, chlorophenol, butyl phenol, and methyl phenol; ketones, such as acetone, methyl ethyl ketone, methyl isobutyl ketone, and cyclohexanone; esters, such as methyl acetate, butyl acetate, ethyl acetate, and methyl ethyl acetate; chlorinated hydrocarbons, such as chloroform, dichloromethane, carbon tetrachloride, dichloroethane, trichloroethane, trichloroethylene, tetrachloroethane and methylene chloride; other hydrocarbons such as ethane, cyclohexane, hexane, benzene, styrene, dichlorobenzene, toluene, and xylene; aldehydes; and acids such as acetic acid.

Potential applications of the invention are numerous. Several are contemplated as follows.

Ground water remediation. There are a multitude of aquifers contaminated with organics such as carbon tetrachloride, methylene chloride, chloroform, trichloroethanes, trichloroethylenes, tetrachloroethanes, tetrachloroethylenes and phenols, aldehydes and ketones. These contaminates could be removed using membranes prepared and used in accordance with methods of the invention.

Industrial process streams. There are many process streams which can be made more effective by using methods of the invention. Examples include process streams for recovery and recycling of components to assist in shifting of the equilibrium of a chemical reaction to optimize product production, washing and drying of product, recovery of valuable reactants and catalysts, and removal of organic cleaners and solvents.

Cleanup and minimalization of mixed hazardous waste. Radio-nuclides are often found in storage tanks in the presence of processing components. In many cases there are liquids present both aqueous and organic, which add to the total volume of material that must be stored as contaminated waste. If a separation technique, such as one utilizing a membrane, could remove the liquid components from the radioactive species, significant benefits could be realized.

In the following Examples, the methods of the invention are carried out in the illustrated laboratory apparatus of FIG. 1.

EXAMPLE 1

A flat, circular polyphosphazene membrane, 4.7 cm in diameter was solution cast from tetrohydrofuran (THF) containing 8 wt % polyphosphazene and 3 wt % benzoyl peroxide. After the THF was evaporated, the membrane was crosslinked by heating at 200° C. for five minutes. The formed membrane was placed onto a porous support in one of the two halves of the cell of FIG. 2 which was 44.5 mm inside diameter and 85.8 mm outside diameter. The two halves were then bolted together using O-ring seals to secure the membrane a short distance from the support. The thickness of the membrane was not measured but was between 1 and 100 $\mu$m, which is typical. The feed solution consisted of one liter of isopropyl alcohol containing 0.0259 gm of the red dye, rose bengal. The feed solution was circulated at 20 ml/min through the cell. This technique maximally saturated the membrane as indicated by the appearance of saturated solution on the permeate side. A vacuum was then applied to the permeate side of the swollen membrane and the following data was collected.

TABLE 1

Flux and Permeation of Dye and Solvent

| Collection Time (hours) | Color | Flux (mls) | Vac (mmHg) | Temp. (°C.) |
|---|---|---|---|---|
| 0.5 | Red | 5 | 200 | 40 |
| 0.15 | Pink | 5 | 2 | 40 |
| 1.0 | Clear | 150 | 2 | 70 |

This demonstrates that a membrane that is prepared by swelling in combination with subsequent application of a vacuum to the permeate side of the membrane, essentially completely separates the alcohol from the dye at high flux rates.

EXAMPLE 2

The membrane was prepared and mounted in the cell as in Example 1. The feed solution consisted of one liter of the solvent isopropyl alcohol containing, as solutes, 0.025 gm of methylene blue and 0.025 gm of rose bengal. The temperature was 70° C. A vacuum was applied incrementally as shown by the data. As the vacuum was increased, the amount of dye retained in the membrane increased until the permeate was clear. Results are shown in Table 2.

TABLE 2

Amount of Selective Retention of Dyes by the Membrane

| Increasing Vacuum (mmHg) | 650 | 400 | 250 | 150 | 2 |
|---|---|---|---|---|---|
| Rose Bengal (%) (% retention) | 0 | 67 | 48 | 100 | 100 |
| Methylene Blue (%) (% retention) | 0 | 56 | 52 | 90 | 90 |

This illustrates the dynamic selection of solute retention as a function of vacuum depressurization applied to the permeate side of the membrane. The data also shows the selective transport at low vacuum of one molecular size dye over another. Methylene blue has a molecular weight of 374 and rose bengal has a molecular weight of 1018.

EXAMPLE 3

A silicone rubber membrane was laid on a porous paper backing and mounted in a cell as in Example 1. The solution consisted of one liter of isopropyl alcohol containing 0.0125 g of methylene blue. Feed flow was 25 ml/min. At the beginning of the experiment, no vacuum was applied to the permeate side of the membrane at which surface there was a pressure of 650 mmHg. Approximately 30 psi of pressure was applied to the feed side for the time periods shown in Table 3. Subsequentially, a vacuum of 2 time periods shown in Table 3. This sequence of running with and without a vacuum was repeated three times.

TABLE 3

Effect of Vacuum on Permeation

| Collection Time (hrs) | Color | Flux (mls) | Vac (mmHg) | Temp. (°C.) |
|---|---|---|---|---|
| 1.0 | Blue/violet | 15 | 650 | 22 |
| 1.50 | Clear/colorless | 5 | 2 | 22 |
| 1.0 | Blue/violet | 2 | 650 | 22 |
| 2.0 | Clear/colorless | 10 | 2 | 22 |
| 2.0 | Blue/violet | 10 | 650 | 64 |
| 4.0 | Clear/colorless | 55 | 2 | 59 |

This example illustrates the necessity of having a vacuum on the permeate side of the membrane in order to obtain optimum separation of solvent and solute.

EXAMPLE 4

In this example, a polyphosphazene membrane (an uncross-linked polymer from ATOCHEM*, designated as lot JP-225) which does not swell in isopropyl alcohol was used. The membrane was mounted in the cell as in Example 1 and then allowed to soak overnight. Three experimental runs were made under vacuum and at different temperatures. The results shown in Table 4 indicate almost no transfer of solution.

(*Elf-ATOCHEM North America Inc., King of Prussia, Pa.)

TABLE 4

Effect of Membrane Conditions on Flux and Permation

| Collection Time (hours) | Color | Flux (mls) | Vac (mmHg) | Temp. (°C.) |
|---|---|---|---|---|
| 3.0 | NA | 0 | 650 | 22 |
| 6.5 | Clear | Trace | 650 | 80 |
| 8.0 | Clear | 0.5 | 2 | 80 |

This example demonstrates that without a swollen membrane even when a vacuum is applied, the flux rates are almost nil.

Whereas this invention is herein illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. A separation process which comprises the steps of:
   (a) placing onto a porous support a membrane capable of swelling in the presence of a solution comprising at least one solvent and at least one solute;
   (b) applying the solution to the feed side of the membrane to allow the membrane to swell substantially maximally
   (c) subsequently applying vacuum depressurization to the permeate side of the membrane while the solution is passed to the feed side of the membrane to thereby provide a flux rate through the membrane; and
   (d) continuing to adjust and selectively apply said vacuum depressurization until the desired separation of the solvent and solute and the desired flux rate are attained.

2. A separation process according to claim 1, wherein step of placing the membrane onto a porous support includes the step of directly polymerizing the membrane onto the porous support.

3. A separation process according to claim 1, wherein the step of placing the membrane onto a porous support includes the step of securing the membrane over the porous support so that the membrane is supported against the porous support.

4. A separation process according to claim 1, wherein the step of placing the membrane onto a porous support includes the step of securing the membrane with respect to the porous support whereby during separation of the solution, the membrane is supported by the porous support.

5. A separation process according to claim 1, wherein the step of placing the membrane onto a porous support includes the step of securing the membrane a distance from the porous support, said distance being such that during separation of the solution, at least a portion of the membrane is against the porous support.

6. A separation process according to claim 1, wherein the extent of vacuum depressurization is varied from time to time depending upon the selectivity of separation of solvent and solute and the flux rate desired.

7. A separation process according to claim 1, wherein the solvent is selected from the group consisting of alcohols, ketones, esters, hydrocarbons, halogenated hydrocarbons, aldehydes, and acids.

8. A separation process according to claim 1, wherein the solvent is selected from the group of alcohols consisting of ethanol, methanol, isopropanol, and glycerol.

9. A separation process according to claim 1, wherein the membrane is selected from the group consisting of polyphosphazene, polysilicones, polysulfones, polyesters, polyurethanes, polyimides, polyamides, polyacetates, silicone rubbers, polydimethylsiloxanes, polyethersulfones, and polyetheramides.

10. A separation process according to claim 1, wherein the porous support is in the form of flat discs, sheets, tubes, fibers, spirals, and cylinders of perforated metal, ceramic, glass, plastic or polymer.

11. A separation process according to claim 1, wherein the porous support is a scintered body of compressed particles of ceramic, metal, or glass.

12. A separation process according to claim 1, wherein the membrane is supported by porous supporting means within a solution flow-through cell.

13. A separation process according to claim 12, wherein a sweep gas is introduced into and passed through the cell on the permeate side of the membrane.

14. A separation process according to claim 1, wherein the solution that does not pass through the membrane is recirculated into a feed solution.

* * * * *